Figure 1:
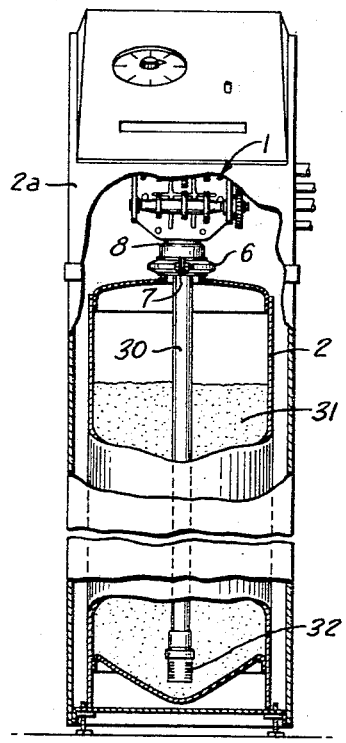

Nov. 14, 1967 J. S. ENTRINGER ET AL 3,352,419
DUAL CAM SHAFT CONTROL VALVE FOR AUTOMATIC WATER SOFTENER
Filed Aug. 17, 1964 3 Sheets-Sheet 1

INVENTORS.
JAMES S. ENTRINGER
LAWRENCE P. MARKS
HAROLD D. RITCHIE
BY Howard J. Barnett
ATTORNEY Nov. 14, 1967     J. S. ENTRINGER ETAL     3,352,419
DUAL CAM SHAFT CONTROL VALVE FOR AUTOMATIC WATER SOFTENER
Filed Aug. 17, 1964     3 Sheets-Sheet 2

INVENTORS.
JAMES S. ENTRINGER
LAWRENCE P. MARKS
BY    HAROLD D. RITCHIE

Howard J. Barnett
ATTORNEY

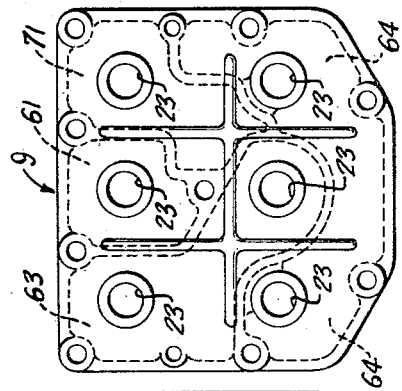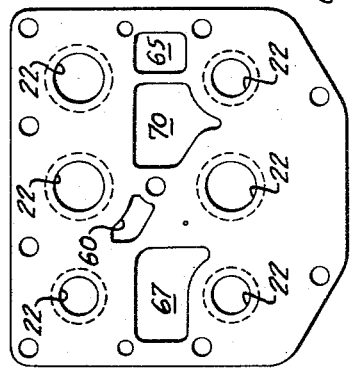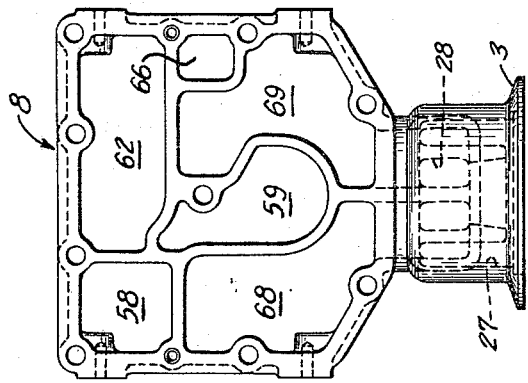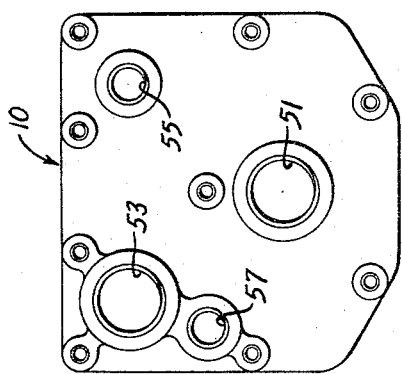

United States Patent Office 3,352,419
Patented Nov. 14, 1967

3,352,419
DUAL CAM SHAFT CONTROL VALVE FOR AUTOMATIC WATER SOFTENER
James S. Entringer, Elm Grove, Lawrence P. Marks, Brown Deer, and Harold D. Ritchie, Menomonee Falls, Wis., assignors, by mesne assignments, to Culligan, Inc., North Brook, Ill., a corporation of Delaware
Filed Aug. 17, 1964, Ser. No. 389,962
7 Claims. (Cl. 210—140)

This invention is directed to an automatic water softener control valve, and more particularly, to a cam controlled valve of improved, compact construction having a three-part vertical manifold and dual cam shaft actuating system.

Various automatic water softener designs have been proposed in the past. For example, a water softener having cam actuated poppet valves for controlling the regeneration cycle was proposed in U.S. Patent 2,460,011, issued to C. Hungerford, Jr. et al. on Jan. 25, 1949. This patent, however, proposed a complex dual manifold valve system, which creates additional valve maintenance problems and takes extra, much needed space, especially in domestic use.

Improvements on the construction of a cam operated valve were disclosed in U.S. Patent 2,800,229, issued to C. A. Spaulding, Jr. on July 23, 1957. Spaulding taught the mounting of the individual valves and actuators on a valve casing which was detachably mounted on a manifold, and which could be completely separated as a unit without dismantling the valve or disconnecting any of the water softener pipes. However, Spaulding's construction still had several shortcomings.

The Spaulding control valve was disposed *alongside* the softener tank, thereby taking additional lateral floor space. Also, there was a bolted connection between the water softener tank and the valve, which created a servicing problem. The end closure for the water softener tank comprises a large cover which was secured to the tank body by a plurality of bolts which required considerable effort to disconnect when it was necessary to remove the tank cover.

An additional problem with the Spaulding construction was that the plumbing pipes connected directly into the end closure of the softener tank, so that it was necessary to disconnect the plumbing pipes to remove the end closure of the softener tank, because the dip tube (pipe 16) was connected directly to the end closure (cover 14) and prevented sliding the tank laterally away from the end closure and the plumbing pipes (34, 40, 44).

This invention is an improvement over Spaulding, because it includes a manifold body which also serves as the tank cover. The valve may be readily removed with the tank cover because all of the pipes of the softener are connected to a vertically disposed base plate, which is independent of the softener tank. The base plate is connected by self-tapping screws to the manifold body, which connects to a valve body. The manifold body is integral with the cover of the water softener tank, and the valve body, which includes the poppet valve assemblies, is a separable unit, which may be readily disconnected without disturbing any other part of the valve. The valve is disposed directly above the water softener tank to conserve valuable floor space. The valve body and the manifold body can both be removed for maintenance or replacement without disturbing the connecting pipes or the base plate.

A portion of the manifold body serves as the end closure for the softener tank, as mentioned above, and is secured to the tank by means of a V-clamp arrangement which avoids any leakage and also permits disassembly of the valve in a minimum amount of time, since only one bolt is required to hold the V-clamp in place.

Other important improvements of the present invention over prior water softeners include: the direct drive system for the cam actuated valves by the use of a smaller and more powerful motor; non-stick knife edge valve seats; and a space-saving double cam shaft valve control arrangement.

The present invention provides an improved control valve in an automatic water softener which takes less floor space, is more easily maintained, and can be readily removed for servicing. The control valve of the invention serves also as the closure for the softener tank, and is fastened thereto by a V-clamp connection which can be readily disconnected to perform maintenance on either the softener tank or the control valve.

The drawings furnished herewith illustrate the best mode presently contemplated for carrying out the present invention.

Figure 3:
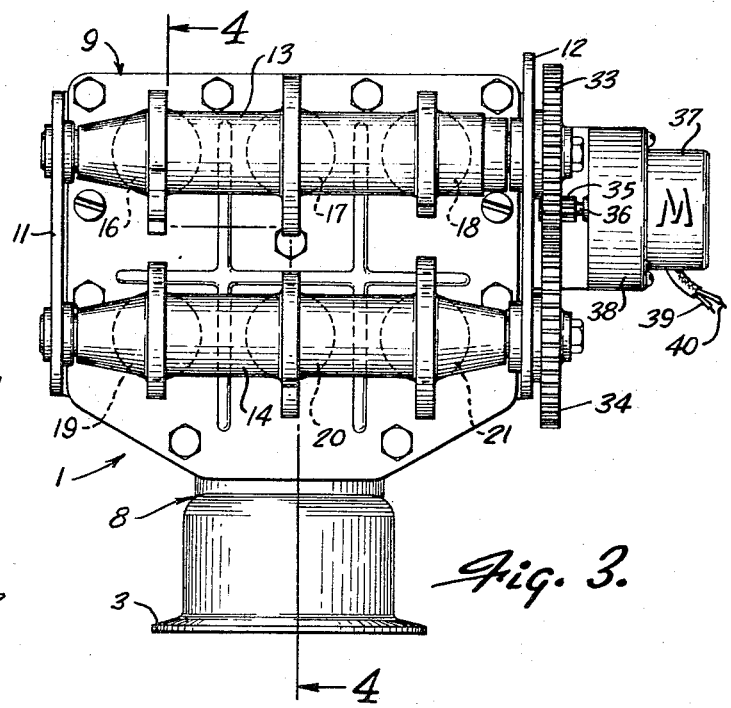
Figure 2:
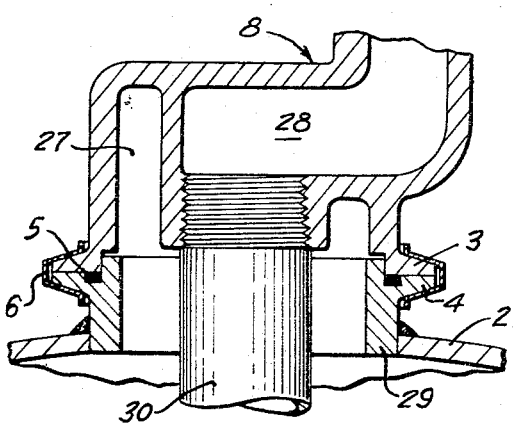
Figure 5:
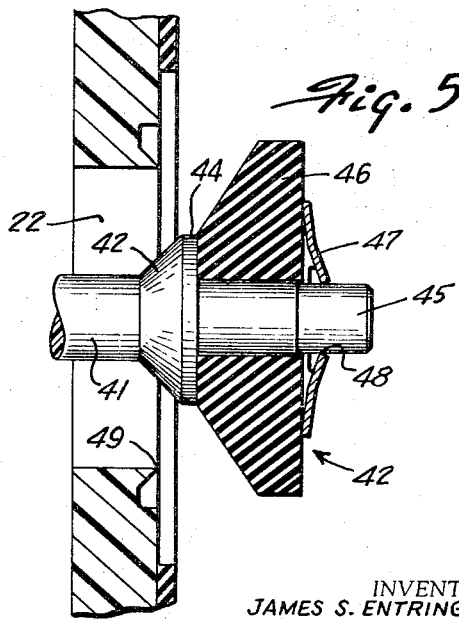
Figure 4:
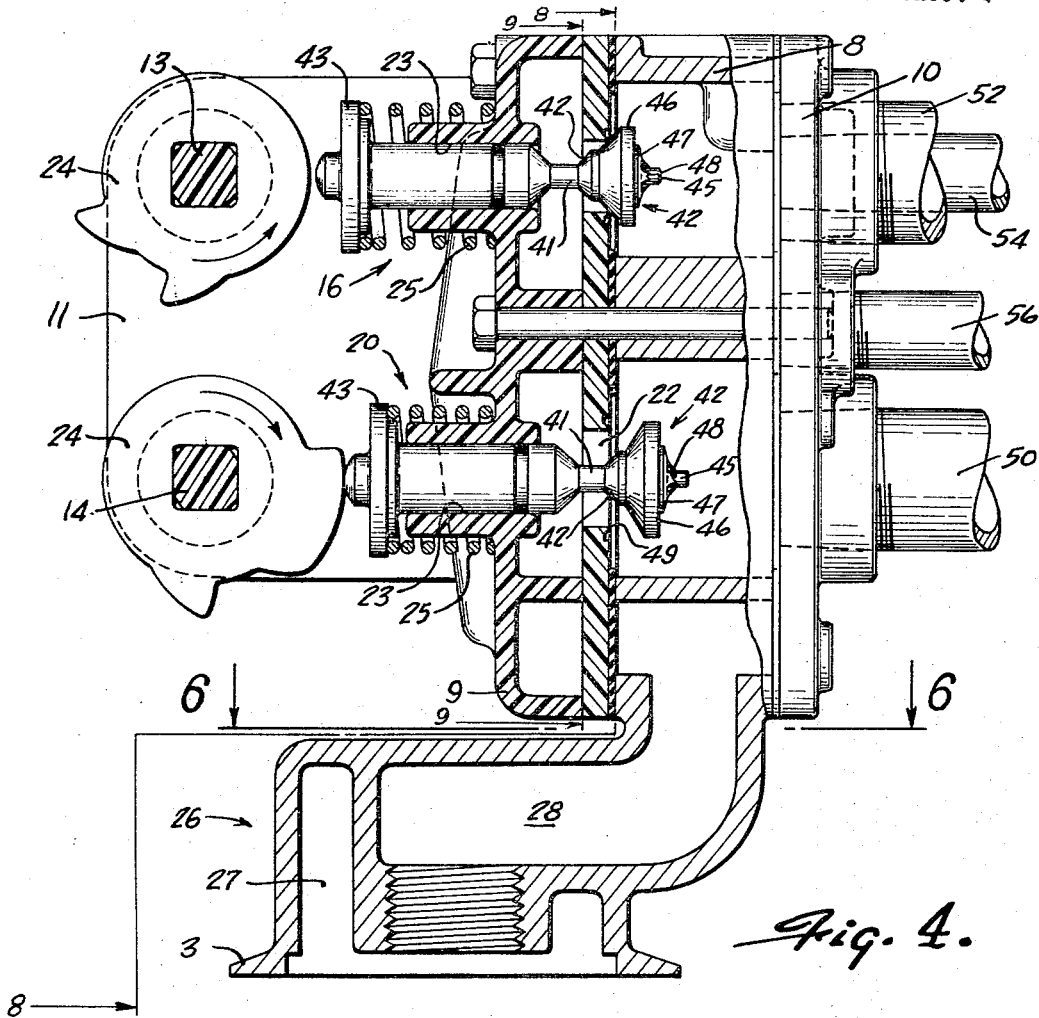
Figure 6:
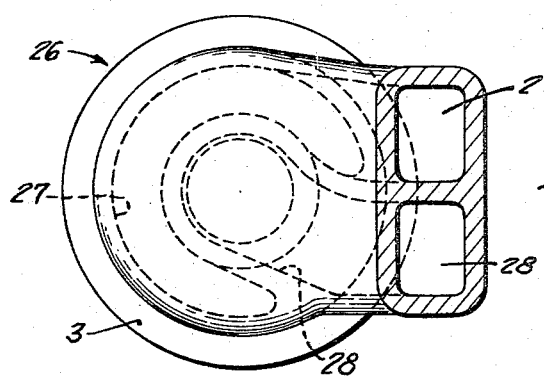

In the drawings:
FIGURE 1 is a perspective view with parts broken away showing the control valve of the invention mounted on a water softener tank;
FIG. 2 is an enlarged detailed sectional view showing the V-clamp connection of the valve to the water softener tank;
FIG. 3 is an enlarged plan view of the control valve of the invention showing the dual cam shaft arrangement and the valve disposition;
FIG. 4 is a side view, partly in section; along line 4—4 of FIG. 3, showing the three-part construction of the valve, and the novel plumbing connection of the valve;
FIG. 5 is an enlarged sectional view with parts broken away showing details of the valve seat and valve connection to the valve stem;
FIG. 6 is a section through the manifold body taken on line 6—6 of FIG. 4;
FIG. 7 is a plan view of the valve base plate showing the inlet, outlet, drain and brine connections;
FIG. 8 is a plan view taken on line 8—8 of FIG. 4, partly in section, showing the manifold body;
FIG. 9 is a plan view of the base plate of the valve body taken along line 9—9 of FIG. 4; and
FIG. 10 is a plan view of the valve body showing the valve chambers in phantom.

As shown in the drawings, a control valve 1 is disposed on top of a water softener tank 2. If desired, the valve 1 and tank 2 may be enclosed in a housing 2a. The valve 1 includes a flange 3, which is disposed in abutting contact with a matching flange 4 on the top of the softener tank 2.

Annular gasket or O-ring 5 surrounds the inner edges of the abutting flanges 3 and 4, and is held in place by an annular V-clamp 6. The V-clamp 6 is tightened around the gasket 5 by means of a bolt assembly 7.

The control valve 1 comprises a central manifold body 8, a valve body 9, and a base plate 10. A pair of side plates 11 and 12 are secured to the manifold body 8 and provide mounting means for parallel cam shafts 13 and 14 which are disposed a predetermined distance from the valve body 9. The valve body 9 includes a plurality of valves 16–21, which extend through valve ports 22 and openings 23 in valve body 9 into operable engagement with cam surfaces 24 on cam shafts 13 and 14. Springs 25 bias the individual valves 16–21 against the respective cam surfaces 24, thereby urging the valves towards their closed positions. The cam surfaces 24 operate to open the respective valves against the springs 25.

The manifold body 8 includes a base portion 26 having a peripheral tank inlet passageway 27 and a central tank outlet passageway 28, which directly communicate from the control valve 1 to the softener tank 2. The base portion 26 is generally cylindrical, and is large enough to completely cover and enclose tank opening 29 of the softener tank 2. The base portion 26 includes the central tank outlet passageway 28, which threadably receives a dip tube 30, which extends vertically down through an ion exchange softener bed 31 in the tank 2. The dip tube 30 has a port 32 at the lower end to receive conditioned water after it has traveled downwardly through the bed 31, and to dispense brine and rinse water through the bed 31 during the softener regeneration cycle.

The dual cam shaft arrangement, which includes cam shafts 13 and 14 mounted on support end plates 11 and 12, is an important space-saving feature. Both cam shafts are driven by intermeshing gears 33 and 34, which are driven by a common gear 35 disposed on a drive shaft 36.

Drive shaft 36 is connected to a small motor 37 through a gear train (not shown) disposed inside motor housing 38. Electrical leads 39, 40 supply power to motor 37 on signal from an electric clock timer (not shown), or a manually operated electrical switch.

Cam surfaces 24 are synchronized to open and close the respective valves 16–21 in a predetermined sequence to automatically cycle the control valve 1 through a complete regeneration cycle. A currently preferred type of regeneration cycle is disclosed in the co-pending application of William A. Staats, Ser. No. 336,555, filed Jan. 8, 1964, and assigned to a common assignee herewith.

As can be seen in FIG. 3, the motor 37 is compact, and does not take any additional space beyond the width of the softener tank 2. The dual row of valves 16–21 also adds to the compactness of the valve 1.

The valve body 9 includes the complete assemblies of the valves 16–21. As seen in FIG. 3, the valves 16–21 are disposed in two horizontal rows of three valves each, which greatly reduces the width of the control valve 1. FIGURE 1 shows that the complete profile of the valve 1 is not as wide as the tank 2, so that the water softener can be disposed in a smaller floor space than would otherwise be possible. The various chambers, passageways, inlets, and outlets of the valve 1 are best shown in FIGS. 6–10, and will be described later.

The individual valves 16–21 each comprise a valve stem 41, a valve piston 42, and a valve head 43. The valve piston 42 is urged by spring 25 to close the valve port 22, thereby preventing flow through the valve unless the cam surfaces 24 counteract the force of spring 25 to move the valve piston 42 to its open position.

The valve piston 42 includes a flange 44, a stud 45, a beveled neoprene washer 46, and a metal Tinnerman washer 47. The neoprene washer 46 is held firmly in place on the stud 45 by the washer 47, which has teeth 48 which grip into the stud 45. As best seen in FIG. 5, the valve port 22 has a knife edge 49 to assure complete sealing of the valve when closed, and to avoid foreign particles sticking in the valve in the closed position.

The neoprene washers 46 can be replaced easily by removing the washer 47. Because the valve piston 42 is disposed outside the valve body, the neoprene washer 46 and the metal washer 47 are readily accessible, and the washers 46 can be changed easily.

Referring now to FIGS. 6–10, it can be seen that the base plate 10 provides the sole external plumbing inlets and outlets to the valve 1. The main raw water inlet pipe 50 enters the plate 10 through a centrally disposed threaded inlet opening 51 (FIG. 6) opening into a first chamber 59. Tap water outlet pipe 52 is threadably connected to the base plate 10 at the threaded outlet opening 53 communicating with an outlet chamber 62. Brine pipe 54 enters at a relatively smaller threaded brine opening 55 opening into a brine chamber 58. A drain pipe 56 is threadably connected at a drain opening 57 communicating with a drain chamber 66 adjacent the outlet opening 53. Thus it can be seen that all external plumbing connections are made through the base plate 10. This feature is particularly advantageous when the softener must be disconnected for maintenance. This becomes particularly important where the original plumbing installation did not use unions. When unions are not used, the disconnection of the plumbing becomes most difficult without the single external plumbing connection concept of the invention.

The valve 16, which is normally closed, is designated as the brine valve. Valve 16 opens during the brining portion of the regeneration cycle to permit the flow of brine from brine pipe 54 through a brine chamber 58 of the manifold body 8, and from there through the brine valve 16 and associated valve port 22 into a second chamber 63 in the valve body 9. Normally closed valve 17 is the by-pass valve which opens and remains open during the regeneration cycle to receive unsoftened water from the first chamber 59 of the raw water inlet service valve 20, through by-pass valve inlet passageway 60, and into by-pass valve chamber 61 in the valve body 9. The by-passed water then flows through the valve port 22 of by-pass valve 17, into outlet chamber 62, and from there through the outlet opening 53 and through outlet pipe 52.

The normally open service valve 18 is only closed during the brining portion of the regeneration cycle to prevent any brine from back washing into the outlet pipe 52. All of the spent brine must therefore go out through the normally closed drain valve 21, which is open only during the regeneration cycle. During the backwash portion of the regeneration cycle, the normally closed backwash drain valve 19 opens, and receives backwash water from softener tank 2. The backwash water flows out through the tank inlet passageway 27 into tank inlet chamber 68 and through passageway 67 into second chamber 63 which is sealed off by the closed valves 16 and 20; flow to the drain occurring through port 22 of the backwash drain valve 19, through an interconnecting wash drain chamber 64 in the valve body 9, out through drain passageway 65, drain chamber 66 and the drain pipe 56.

The outlet chamber 62 communicates through the by-pass valve 17 and the second service valve 18 to provide water to the outlet pipe 52 at all times. During the regeneration cycle, the by-pass valve 17 is open, the service valve 18 is closed, and raw water is provided to the outlet pipe 52. The raw water comes in through the raw water inlet service valve 20. Because the valve 20 is closed during the regeneration cycle, the water flows through the inlet passageway 60 into by-pass valve chamber 61, and from there through by-pass valve 17 out through the outlet chamber 62 and to the outlet pipe 52.

When the softener is in normal service, the water comes in through inlet pipe 50 to the chamber 59 and then through the valve port 22 of the open inlet service valve 20 into the second chamber 63 of the valve 20. Since the brine valve 16 is closed during service, the incoming raw water then flows out through an outlet passageway 67 (FIG. 9) of the chamber 63 into a tank inlet chamber 68 of the manifold body 8. The tank inlet chamber 68 communicates with the tank inlet passageway 27 so that the raw water flows down through the softener bed 31 to the bottom of the tank 2. The water is softened during its flow through the bed, and flows out into dip tube port 32, tank outlet passageway 28, through a tank outlet chamber 69 in the manifold body 8, and from there through an inlet passageway 70 to a first chamber 71 (FIG. 10) of outlet service valve 18. The softened water then flows through the valve port 22 of the valve 18, which is open during service, into the outlet chamber 62 and through outlet pipe 52 to the point of use.

When the softener is exhausted, the raw water inlet valve 20 is closed and the bypass valve 17 and backwash drain valve 19 are opened; brine valve 16 and drain valve 21 remaining closed and service valve 18 remaining open. During the ensuing backwashing operation, water is supplied to service by passing from inlet pipe 50 to the chamber 59, through inlet passageway 60 to the by-pass chamber 61, and then through the valve port 22 of by-pass valve 17 to the outlet chamber 62 and the pipe 52.

Water also upon entering outlet chamber 62 can pass through the valve port 22 of service valve 18 to first chamber 71 and then through inlet passageway 70 to enter tank outlet chamber 69. The water then passes downward through the tank outlet passageway 28 and the dip tube 30 to the bottom of the tank where the water passes out the dip tube port and up through the resin bed to remove impurities and loosen the bed. The effluent exits through the tank inlet passageway 27 into the tank inlet chamber 68. As the brine valve 16 and the inlet valve 20 are closed, liquid cannot exit through outlet passageway 67 to the second chamber 63. The valve port 22 of the backwash drain valve 19 is open to allow flow of the backwash effluent to the interconnecting drain chamber 64 and through this drain chamber 64 to and through the drain passageway 65, drain chamber 66 and the drain pipe 56.

Once backwashing has been terminated, the brine valve 16 and drain valve 21 open, the service valve 18 and the backwash drain valve 19 close, the inlet valve 20 remains closed and the by-pass valve 17 remains open allowing the by-pass of raw water to service. Brine from a suitable source under pressure, such as that shown in the copending William A. Staats application Ser. No. 336,555, enters the brine chamber 58 from pipe 55 and passes through the valve port 22 of the brine valve 16, through the chamber 63, the outlet passage 67, tank inlet chamber 68 and through the tank, with the effluent from the tank passing through tank outlet chamber 69 and open drain valve 21 to the interconnecting drain chamber 64 and thence through the drain passageway 65, drain chamber 66 and the drain pipe 56.

When sufficient brine has passed through the resin bed, the brine valve 16 closes and the inlet valve 20 opens to provide a rinse stage for the resin bed where rinse water enters the first chamber 59 from the inlet pipe 50, through the port 22 of inlet valve 20, into chamber 63, through the outlet passage 67, tank inlet chamber 68, and tank inlet passageway 27. The effluent returns to the valve through tank outlet passage 28 and tank outlet chamber 69, through the port 22 of drain valve 21 into interconnecting drain chamber 64 through drain passageway 65 and drain chamber 66 to the drain pipe 55. If a brine pulsing regeneration is utilized, then the cam for the brine valve 16 has two or more projections as shown in FIG. 4, and, as disclosed in the copending Staats application Ser. No. 336,555, a weep or bleed passageway would provide a slow rinse between brine pulses.

As can be seen, the dual cam shaft valve of the invention is compact, and utilizes a very minimum of lateral space because of its unique construction. The valve is assembled so that it is readily removed from service for maintenance without in any way disturbing the pipes of the plumbing connections, because of the base plate connection of the pipes. The valve seats are easily accessible for replacement, and the V-clamp connection to the softener tank permits rapid disconnection of the valve from the tank.

The dual cam shaft water softener control valve of the invention is a combination of the above features which provides an improved automatic water softener of the poppet valve type which takes less floor space, and is more easily maintained by virtue of its simplified and improved construction.

Various modes of carrying out the invention are contemplated as being within the scope of the following claims, particularly pointing out and distinctly claiming the subject matter which is regarded as the invention.

We claim:

1. An automatic water softener comprising a water softener tank having a single opening therein, said opening having a raised flange portion, a control valve having a complementary flange portion, a rapid disconnect means including clamping means surrounding said flange portions to connect the control valve to said softener tank, a separable base plate defining a portion of the control valve, said plate having openings therein for receiving all external plumbing connections for said water softener tank and control valve, whereby said control valve can be separated from the base plate without disturbing any external plumbing connections to said valve and said control valve can be removed from the softener tank by disconnecting the rapid disconnect means, a plurality of poppet-type valves in said control valve for controlling the flow of liquid through said water softener tank, a knife edge seat for each poppet-type valve, said control valve including a central manifold body and a valve body containing said plurality of poppet-type valves, each poppet-type valve controlling a port in one side of said valve body, said manifold body being positioned between and secured to both the ported side of the valve body and the base plate, said valve body having a plurality of interconnecting chamber and passageways and said manifold body having a plurality of wall portions defiining chambers interconnecting the external plumbing connections in said base plate and the chambers, passageways and ports in said valve body to said water softener, said poppet-type valves providing a raw water inlet valve, a service valve, a by-pass valve, a brine valve, a backwash drain valve and a drain valve; said base plate having an onlet opening, a service outlet opening, a brine opening, and a drain opening; said manifold body including a first chamber of the manifold body communicating with said inlet opening, a by-pass valve inlet passageway in the valve body, and said raw water inlet valve and port; a tank inlet chamber communicating with a tank inlet, an outlet passageway in the valve body and said backwash drain valve and port; a tank outlet chamber communicating with a tank outlet, an inlet passageway in the valve body, and said drain valve and port; an outlet chamber communicating with said service outlet opening, said by-pass valve and port, and said service valve and port; a brine chamber communicating with said brine opening and said brine valve and port; and a drain chamber communicating with said drain opening and a drain passageway in the valve body; and said valve body having a first chamber of the valve body communicating with the inlet passageway and said service valve and port; a second chamber of the valve body communicating with the outlet passageway in the valve body, said raw water inlet valve and port, and said brine valve and port; a by-pass valve chamber communicating with the by-pass valve inlet passageway and said by-pass valve and port; and an interconnecting drain chamber communicating with the drain passageway, said drain valve and port, and said backwash drain valve and port.

2. An automatic water softener as set forth in claim 1, in which the poppet-type valves are positioned in two rows, each row aligned with a cam shaft having cam actuating means for each poppet-type valve, a common drive means for said cam shafts to operate said poppet-type valves in a predetermined sequence for automatic control of said water softener, said drive means including an electric motor having an integral gear reduction train.

3. An automatic water softener as set forth in claim 2, in which each poppet-type valve includes a piston comprising an integral base portion yieldably biased against said cam actuating means, an integral stud member extending axially from said base portion, an annular valve seat sealing member disposed on said stud member, and retaining means holding said sealing member in place against said base portion, said retaining means being readily removable for replacement of said sealing member.

4. An automatic water solftener as set forth in claim 3, in which said retaining means comprises an annular metal member having serrated teeth around a central opening, said teeth being biased against and penetrating the stud member to retain the valve seat sealing member in place against the base portion of said valve piston.

5. An automatic water softener as set forth in claim 1, in which said clamping means comprises an annular V-clamp encompassing said flange portions and bolt assembly to tighten the clamp.

6. An automatic water softener as set forth in claim 1, in which during service, the raw water inlet valve and the service valve are open and the remaining valves are closed; during backwashing, the by-pass valve, backwash drain valve and service valve are open and the remaining valves are closed; during brining the brine valve, by-pass valve and drain valve are open and the remaining valves are closed; and during rinsing the raw water inlet valve, by-pass valve and drain valve are open and the remaining valves are closed.

7. An automatic water softener as set forth in claim 1, in which during service, raw water flows from the inlet opening through the first chamber in the manifold body, the inlet valve, the second chamber of the valve body, the outlet passageway, the tank inlet chamber and the tank inlet passageway to the top of the tank, and softened water flows through the tank outlet passageway, the tank outlet chamber, the inlet passageway, the first chamber of the valve body, the service valve, and the outlet chamber to the service outlet opening; during back-washing, water flows from the inlet pipe through the first chamber of the manifold body, the by-pass valve inlet passageway, the by-pass valve chamber, the by-pass valve, the outlet chamber and to both the service outlet opening and through the service valve, the first chamber of the valve body, the inlet passageway, the tank outlet chamber and the tank outlet passageway to the bottom of the tank, up through the bed and through the tank inlet passageway, the tank inlet chamber, the backwash drain valve, the interconnecting drain chamber, the drain passageway and the drain chamber to the drain pipe; during brining, brine from a suitable source to the brine opening flows through the brine chamber, the brine valve, the second chamber in the valve body, the outlet passageway, the tank inlet chamber and the tank inlet passageway and down through the bed, the effluent passing through the tank outlet passageway, the tank outlet chamber, the drain valve, the interconnecting drain chamber, the drain passageway and the drain chamber to the drain opening, while raw water is by-passed through the first chamber of the manifold body, the by-pass valve inlet passageway, the by-pass valve chamber, the by-pass valve, and the outlet chamber to the service outlet opening; and during rinsing, water flows through the inlet opening, the first chamber of the manifold body, the inlet valve, the second chamber of the valve body, the outlet passageway, the tank inlet chamber and the tank inlet passageway to flow downward through the bed, the effluent passing through the tank outlet passageway, the tank outlet chamber, the drain valve, the interconnecting drain chamber, the drain passageway and the drain chamber to the drain opening, while water continues to be by-passed to the service outlet opening.

References Cited

UNITED STATES PATENTS

| | | | |
|---|---|---|---|
| 2,103,503 | 12/1937 | White | 251—357 X |
| 2,681,147 | 6/1954 | Braswell | 210—288 X |
| 2,768,950 | 10/1956 | Kryzer et al. | 210—139 X |
| 2,800,229 | 7/1957 | Spaulding | 210—190 X |
| 2,801,764 | 8/1957 | Russell et al. | 220—46 |
| 2,832,373 | 4/1958 | Scholer | 210—190 X |
| 2,893,423 | 7/1959 | Seney | 251—333 X |
| 3,075,555 | 1/1963 | Yaeger | 210—138 X |
| 3,169,110 | 2/1965 | Rudelick | 210—278 X |
| 3,217,885 | 11/1965 | Johnson | 210—134 |

REUBEN FRIEDMAN, *Primary Examiner.*

F. SPEAR, *Assistant Examiner.*